(12) United States Patent
Horiba et al.

(10) Patent No.: US 8,282,107 B2
(45) Date of Patent: Oct. 9, 2012

(54) OIL SEAL FOR RECIPROCATION MOTION

(75) Inventors: Kazuyoshi Horiba, Minato-ku (JP);
Kazuhiko Yonezawa, Minato-ku (JP);
Shinichi Sumimoto, Katsushika-ku (JP);
Seiji Miyazawa, Katsushika-ku (JP)

(73) Assignees: KYB Corporation, Tokyo (JP); Arai Seisakusho Co., Ltd, Tokyo (JP)

( * ) Notice: Subject to any disclaimer, the term of this patent is extended or adjusted under 35 U.S.C. 154(b) by 0 days.

(21) Appl. No.: 12/310,667

(22) PCT Filed: Sep. 4, 2007

(86) PCT No.: PCT/JP2007/067177
§ 371 (c)(1),
(2), (4) Date: Mar. 3, 2009

(87) PCT Pub. No.: WO2008/029786
PCT Pub. Date: Mar. 13, 2008

(65) Prior Publication Data
US 2010/0084824 A1 Apr. 8, 2010

(30) Foreign Application Priority Data
Sep. 4, 2006 (JP) .................................. 2006-238984

(51) Int. Cl.
*F16J 15/32* (2006.01)

(52) U.S. Cl. .......................... 277/551; 277/559; 277/564
(58) Field of Classification Search .................. 277/551, 277/559, 564, 569
See application file for complete search history.

(56) References Cited

U.S. PATENT DOCUMENTS

| | | | | | |
|---|---|---|---|---|---|
| 2,744,772 | A | * | 5/1956 | Amirault et al. | 277/402 |
| 3,501,155 | A | * | 3/1970 | Dega et al. | 277/309 |
| 3,620,540 | A | * | 11/1971 | Jagger et al. | 277/559 |
| 3,947,046 | A | * | 3/1976 | Maruyama et al. | 277/443 |
| 4,084,826 | A | * | 4/1978 | Vossieck et al. | 277/559 |
| 4,174,845 | A | * | 11/1979 | Hadaway | 277/559 |
| 4,195,854 | A | | 4/1980 | Bertin | |
| 4,300,778 | A | * | 11/1981 | Gagne | 277/568 |
| 4,546,985 | A | * | 10/1985 | Forch | 277/560 |
| 4,568,092 | A | * | 2/1986 | Hayashida et al. | 277/559 |
| 4,613,143 | A | | 9/1986 | Butler | |
| 4,709,930 | A | * | 12/1987 | Forch | 277/430 |
| 5,002,289 | A | * | 3/1991 | Yasui et al. | 277/559 |
| 5,183,271 | A | * | 2/1993 | Wada et al. | 277/351 |

(Continued)

FOREIGN PATENT DOCUMENTS
EP 1 666 778 A 6/2006
(Continued)

*Primary Examiner* — Vishal Patel
(74) *Attorney, Agent, or Firm* — DLA Piper LLP (US)

(57) ABSTRACT

An oil seal for reciprocation motion including a seal main body, a resin backup ring, and a holding member. The seal main body includes a seal lip that can be in sliding contact with a reciprocating shaft. The backup ring is disposed such as to support the seal lip from the atmosphere side to ensure durability of the seal lip. In the backup ring, at least a single annular groove is provided on the inner peripheral surface opposing the reciprocating shaft. The annular groove can hold a lubricating material. The holding member holds the backup ring between the holding member and the seal main body in a sandwiched-state. The inner peripheral surface of the backup ring forms a taper that increases in diameter from a sealed side towards an atmosphere side in the axial direction.

2 Claims, 2 Drawing Sheets

U.S. PATENT DOCUMENTS

| | | | |
|---|---|---|---|
| 5,456,475 A * | 10/1995 | Abraham et al. | 210/171 |
| 5,664,651 A * | 9/1997 | Miura et al. | 188/322.17 |
| 5,711,534 A * | 1/1998 | Bengoa et al. | 277/559 |
| 5,860,656 A * | 1/1999 | Obata et al. | 277/559 |
| 6,045,138 A * | 4/2000 | Kanzaki | 277/562 |
| 6,182,975 B1 * | 2/2001 | Matsushima et al. | 277/559 |
| 6,322,082 B1 * | 11/2001 | Paykin | 277/549 |
| 6,494,462 B2 * | 12/2002 | Dietle | 277/549 |
| 6,860,486 B2 * | 3/2005 | Hacker et al. | 277/553 |
| 7,117,594 B2 * | 10/2006 | Preyer | 29/888.07 |
| 7,284,758 B1 * | 10/2007 | Hart et al. | 277/321 |
| 7,506,875 B2 * | 3/2009 | Matsui | 277/559 |
| 2007/0052180 A1 * | 3/2007 | Watanabe et al. | 277/551 |
| 2007/0158917 A1 * | 7/2007 | Paykin | 277/551 |
| 2007/0194538 A1 * | 8/2007 | Munekata et al. | 277/551 |

FOREIGN PATENT DOCUMENTS

| | | |
|---|---|---|
| GB | 2 353 336 A | 2/2001 |
| JP | S60-110767 | 7/1985 |
| JP | H1-136770 A | 9/1989 |
| JP | H9-42463 | 4/2002 |
| JP | 2002-349716 A | 12/2002 |
| JP | 2004-36631 A | 2/2004 |
| JP | 2005-220931 | 8/2005 |
| JP | 2005-273692 A | 10/2005 |
| WO | WO 2005/026588 A | 3/2005 |

* cited by examiner

[Fig. 1]
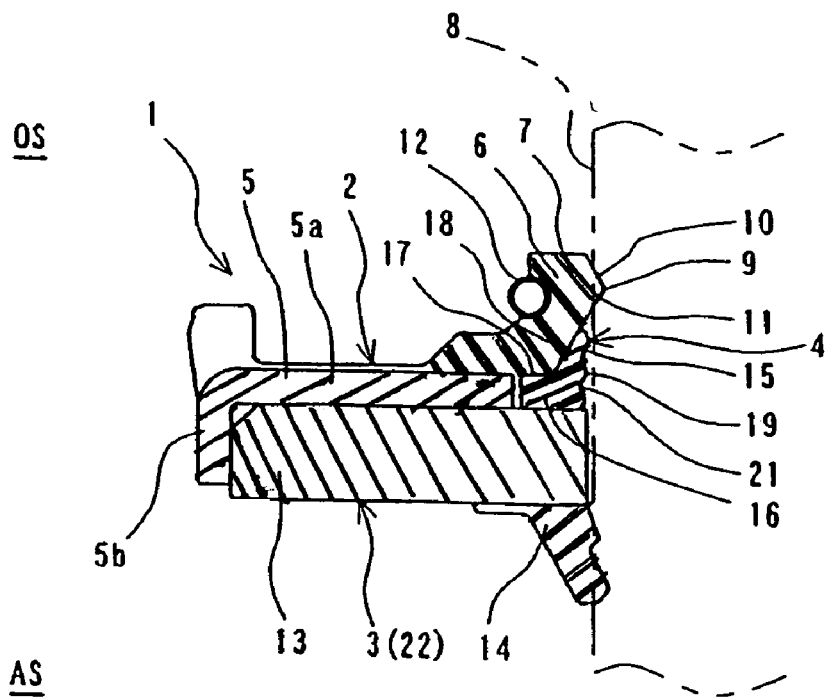
[Fig. 2]
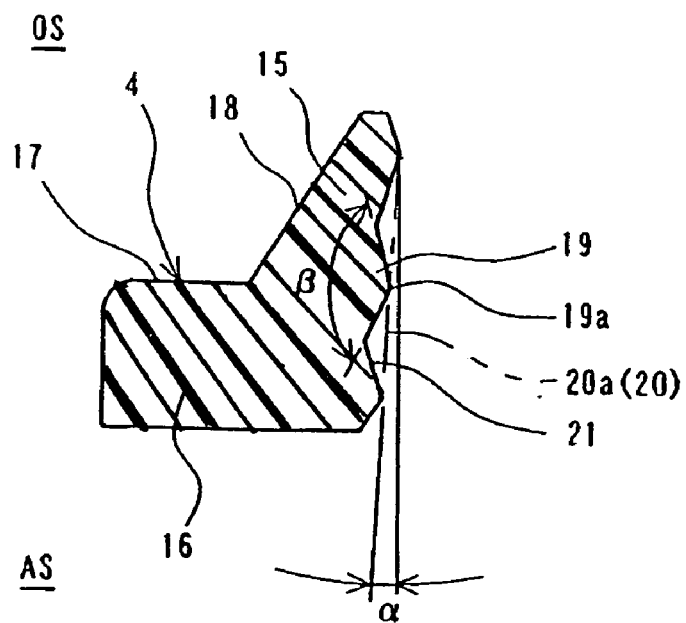

[Fig. 3]
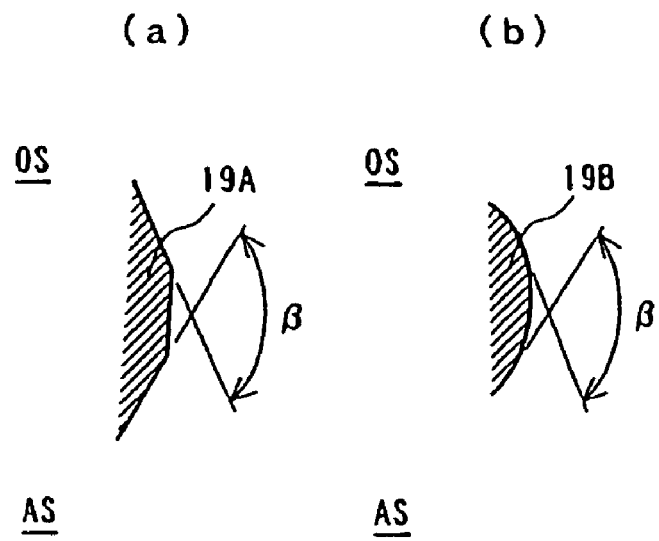
[Fig. 4]
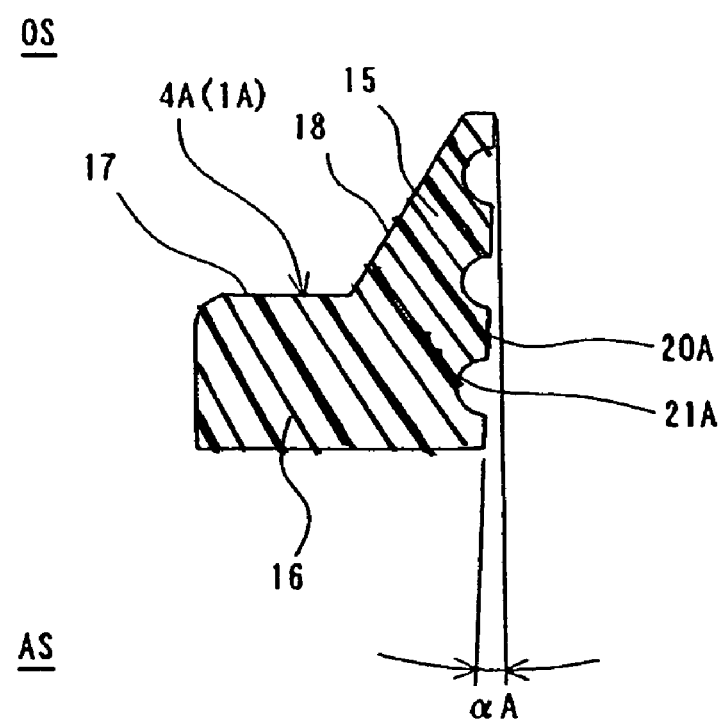

OIL SEAL FOR RECIPROCATION MOTION

TECHNICAL FIELD

The present invention relates to an oil seal for reciprocation motion. In particular, the present invention relates to an oil seal for reciprocation motion including a backup ring that is suitable for ensuring durability of a seal lip.

BACKGROUND ART

Conventionally, as a type of oil seal, an oil seal for reciprocation motion is known that includes a resin backup ring, made of fluorocarbon resin and the like, to ensure durability of a seal lip. The backup ring is disposed such as to support a seal surface of the seal lip. Among oil seals for reciprocation motion such as this, an oil seal for reciprocation motion is known in which an annular groove that can hold a lubricating agent is provided on an inner peripheral surface of the backup ring that extends in parallel with a reciprocating shaft in a setting state in which the oil seal for reciprocation motion is mounted in a sealed location. As a result, when pressure increases on the sealed side, lubrication can be ensured by the lubricating agent filling the annular groove, even when the inner peripheral surface of the backup ring is in contact with the reciprocating shaft over its entire surface. Increase in frictional force and increase in abrasion can be prevented (refer to, for example, Patent Literature 1)

Patent Literature 1: Japanese Unexamined Utility Model Application Publication No. Showa 60-110767 (FIG. 1 and FIG. 3)

However, conventional oil seals for reciprocation motion have a problem in that the oil seals cannot handle demands for high performance made in recent years.

For example, in a conventional oil seal for reciprocation motion, the inner peripheral surface of the resin backup ring is disposed parallel with an outer peripheral surface of the reciprocating shaft. Therefore, when the oil seal is used under high pressure, such as pressure of 2 MPa to 9 MPa on the sealed side, the inner peripheral surface of the backup ring comes into contact with the reciprocating shaft over its entire surface. The annular groove is crushed by the pressure and can no longer hold the lubricating agent.

As a result, abrasion and deformation of the inner peripheral surface of the backup ring advances. A stable sealing performance cannot be maintained by the overall oil seal over a long period of time. Durability deteriorates, and life is shortened.

Therefore, an oil seal for reciprocation motion is required that can achieve high performance with certainty, by preventing the inner peripheral surface of the backup ring from coming into contact with the reciprocating shaft over its entire surface, even when used under high pressure.

SUMMARY OF THE INVENTION

Therefore, the present invention has been achieved in light of the above-described issues. An object of the present invention is to provide an oil seal for reciprocation motion that can achieve high performance with certainty by preventing an inner peripheral surface of a backup ring from coming into contact with a reciprocating shaft over its entire surface.

In order to achieve the aforementioned object, an oil seal for reciprocation motion of the present invention includes a seal main body including a seal lip that can be in sliding contact with a reciprocating shaft. The oil seal for reciprocation motion also includes a backup ring made of resin that is disposed such as to support the seal lip from an atmosphere side to ensure durability of the seal lip. In the backup ring, at least a single annular groove is provided on an inner peripheral surface opposing the reciprocating shaft. The annular groove can hold a lubricating material. The oil seal for reciprocation motion also includes a holding member that holds the backup ring between the holding member and the seal main body in a sandwiched-state. In the oil seal for reciprocation motion, the inner peripheral surface of the backup ring forms a taper that increases in diameter from a sealed side to the atmosphere side along an axial direction. In a steady state, the tapered inner peripheral surface is in a non-contact state with the reciprocating shaft. Even when the oil seal for reciprocation motion is used under high pressure, at least an area of the tapered inner peripheral surface on the atmosphere side is maintained in the non-contact state with the reciprocating shaft. Therefore, the annular groove is not crushed by the pressure. As a result of the configuration, when the oil seal for reciprocation motion is used under high pressure, the inner peripheral surface of the backup ring forming the taper can maintain a non-contact state with the reciprocating shaft in at least an area of the inner peripheral surface of the backup ring on the atmosphere side. Therefore, the annular groove can be prevented from becoming crushed by the pressure.

Another oil seal for reciprocation motion of the present invention includes a seal main body including a seal lip that can be in sliding contact with a reciprocating shaft. The oil seal for reciprocation motion also includes a backup ring made of resin that is disposed such as to support the seal lip from an atmosphere side to ensure durability of the seal lip. In the backup ring, at least a single annular groove is provided on an inner peripheral surface opposing the reciprocating shaft. The annular groove can hold a lubricating material. The oil seal for reciprocation motion also includes a holding member that holds the backup ring between the holding member and the seal main body in a sandwiched-state. In the oil seal for reciprocation motion, a plurality of annular projections are arrayed on the inner peripheral surface of the backup ring along an axial direction. The annular groove is formed by a valley between each annular projection and an adjacent annular projection. A virtual inner peripheral surface formed by a bus linearly connecting peak sections of the annular projections along the axial direction forms a taper that increases in diameter from a sealed side towards the atmosphere side in the axial direction. In a steady state, the tapered inner peripheral surface is in a non-contact state with the reciprocating shaft. Even when the oil seal for reciprocation motion is used under high pressure, at least an area of the tapered inner peripheral surface on the atmosphere side is maintained in the non-contact state with the reciprocating shaft. Therefore, the annular groove is not crushed by the pressure. As a result of the configuration, when the oil seal for reciprocation motion is used under high pressure, the virtual inner surface of the backup ring forming the taper can maintain a non-contact state with the reciprocating shaft in at least an area of the inner peripheral surface of the backup ring on the atmosphere side. Therefore, the annular groove can be prevented from becoming crushed by the pressure.

An angle of the taper is preferably 1 to 15 degrees. Peak angles of the annular projections are preferably 120 to 160 degrees.

The oil seal for reciprocation motion preferably includes a main seal including the seal main body and disposed on the sealed side, and a dust seal disposed on the atmosphere side of the main seal. The dust seal preferably configures the holding member.

In the oil seal for reciprocation motion of the present invention, when the oil seal for reciprocation motion is used under high pressure, the inner peripheral surface of the backup ring that forms a taper can maintain a non-contact state with the reciprocating shaft in at least an area of the inner peripheral surface of the backup ring on the atmosphere side. Therefore, the annular groove can be prevented from becoming crushed by the pressure. As a result, advantageous effects can be achieved, such as high performance being achieved with certainty by the inner peripheral surface of the backup ring being prevented from coming into contact with the reciprocating shaft over its entire surface.

BRIEF DESCRIPTION OF THE DRAWINGS

FIG. 1 is a cross-sectional view of main components of an oil seal for reciprocation motion according to a first embodiment of the present invention;

FIG. 2 is an enlarged cross-sectional view of a backup ring in FIG. 1;

FIG. 3A and FIG. 3B are cross-sectional views of variation examples of annular projections on the backup ring in FIG. 1; and FIG. 4 is an enlarged cross-sectional view of main components of an oil seal for reciprocation motion according to a second embodiment of the present invention.

BEST MODE FOR CARRYING OUT THE INVENTION

Embodiments of the present invention will be described with reference to the accompanying drawings.

FIG. 1 and FIG. 2 are diagrams of an oil seal for reciprocation motion according to a first embodiment of the present invention. FIG. 1 is a cross-sectional view of main components. FIG. 2 is an enlarged cross-sectional view of a backup ring in FIG. 1.

The oil seal for reciprocation motion according to the first embodiment is provided with a plurality of annular projections on an inner surface of a backup ring. The oil seal for reciprocation motion according to the first embodiment is used in a shock absorber (hydraulic draft gear) of a suspension device used in a vehicle, such as an automobile and a two-wheeled vehicle.

As shown in FIG. 1, an oil seal 1 for reciprocation motion according to the first embodiment includes a main seal 2, a dust seal 3, and a backup ring 4. The main seal 2 is disposed on a sealed side OS. The dust seal 3 is disposed on an atmosphere side AS. The backup ring 4 is disposed between the main seal 2 and the dust seal 3.

The main seal 2 prevents a sealing fluid (not shown), such as a lubricating oil, from leaking from the sealed side OS, indicated on the upper side in FIG. 1, to the atmosphere side AS, indicated on the lower side in FIG. 1. The main seal 2 is formed by a seal main body 6 being integrally burned onto a main reinforcing ring 5. The main reinforcing ring 5 serves as a reinforcing ring and is made of a rigid material, such as metal. The seal main body 6 is made of a rubber-like, elastic body. The main reinforcement ring 5 is formed by an annular ring main body 5a and an outer section 5b such as to have an overall ring shape, of which a cross-section forms an almost lateral L-shape. The outer section 5b extends in an almost perpendicular manner from an outer peripheral edge of the ring main body 5a towards the atmosphere side AS, indicated on the lower side in FIG. 1.

An annular seal lip 7 is formed on the seal main body 6 such as to become gradually smaller in diameter from an inner peripheral section of the main reinforcing ring 5 towards the sealed side OS. The seal lip 7 has an appropriate amount of interference with a reciprocating shaft 8, indicated by a two-dot chain line in FIG. 1. The seal lip 7 includes a lip tip 9 that is in sliding contact with the reciprocating shaft 8. The seal lip 7 also includes an oil surface 10 and a seal surface 11. The oil surface 10 has a predetermined oil surface angle allowing an increase in diameter from the lip tip 9 towards the sealed side OS. The seal surface 11 has a predetermined seal angle allowing an increase in diameter from the lip tip 9 towards the atmosphere side AS. A predetermined area of the seal surface 11 on the lip tip 9 side comes into contact with a front surface of the reciprocating shaft 8, with an appropriate amount of interference therebetween. A garter spring 12 is disposed on a back surface of the seal lip 7 on an outward radial direction of the lip tip 9. The garter spring 12 is provided to maintain tension between the seal lip 7 and the reciprocating shaft 8 in a radial direction.

The dust seal 3 is provided to prevent dust, such as dirt and debris, from the atmosphere side AS from infiltrating the sealed side OS. The dust seal 3 is formed by an annular dust lip 14 being integrally burned onto a dust reinforcing ring 13. The dust reinforcing ring 13 serves as a reinforcing ring and is made of a rigid material, such as metal. The dust lip 14 is made of a rubber-like, elastic body. The overall dust lip 14 is formed such as to become gradually smaller in diameter from an inner peripheral section on a bottom surface of the dust reinforcing ring 13, positioned on the atmosphere side AS and indicated on the lower side in FIG. 1, towards the atmosphere side AS.

An outer diameter of the dust reinforcing ring 13 is formed to be slightly larger than an inner diameter of the outer section 5b of the main reinforcing ring 5. The dust reinforcing ring 13 can be mounted by being fitted into a columnar internal space formed by the ring main body 5a and the outer section 5b of the main reinforcing ring 5. A thickness of the dust reinforcing ring 13, indicated in a vertical direction in FIG. 1, is formed to be greater than a depth of the outer section 5b of the main reinforcing ring 5, indicated in the vertical direction in FIG. 1. In a state in which the dust reinforcing ring 13 is attached to the main reinforcement ring 5, the bottom surface of the dust reinforcing ring 13, positioned on the atmosphere side AS and indicated on the lower side in FIG. 1, projects onto the atmosphere side AS from a tip of the outer section 5b of the main reinforcing ring 5. An inner diameter of the dust reinforcing ring 13 is formed to be smaller than an inner diameter of the main reinforcing ring 5 and larger than an outer diameter of the reciprocating shaft 8.

A configuration of the dust lip 14 is the same as a conventionally known dust lip. Therefore, a detailed description thereof is omitted.

The backup ring 4 is provided to ensure durability of the seal lip 7 of the main seal 2. In other words, the backup ring 4 prevents the seal lip 7 from protruding onto the atmosphere side AS and becoming deformed as a result of pressure from the sealed side OS. The backup ring 4 is formed into a ring shape by a resin, such fluorocarbon resin, polyamide, or polyacetal. According to the first embodiment, fluorocarbon resin, and more specifically polytetrafluoroethylene (PTFE), is used. Various compounding agents can be added to fluorocarbon resin as required, based on design concept and the like.

The backup ring 4 according to the first embodiment is formed into a stepped cylindrical shape, of which an outer diameter is stepped by a small diameter section 15 and a large diameter section 16 being connected by a step section 17. The small diameter section 15 has a small outer diameter and is disposed on the sealed side OS. The large diameter section 16 has a large outer diameter and is disposed on the atmosphere side AS. An outer peripheral surface of the small diameter section 15 is a supporting tapered surface 18 formed having a taper angle that is almost the same as the angle of the seal surface 11, such as to become gradually smaller in diameter towards the sealed side OS. The supporting tapered surface 18 is provided such that the seal surface 11 side of the seal lip 7 of the main seal 2 can be supported from the atmosphere side AS.

As shown in FIG. 2, an inner peripheral surface 20 of the backup ring 4 according to the first embodiment, namely a surface opposing the outer peripheral surface of the reciprocating shaft 8, has a plurality of annular projections 19 arrayed along an axial direction, at a predetermined interval. According to the first embodiment, three annular projections 19 are provided. The predetermined interval is, for example, about 0.5 to 1.5 millimeters. The inner peripheral surface 20 of the backup ring 4 is formed such that a virtual inner peripheral surface 20$a$, formed by a bus that linearly connects peak sections 19$a$ of all annular projections 19 along the axial direction, forms a taper that increases in diameter from the sealed side OS towards the atmosphere side AS along the axial direction. The virtual inner peripheral surface 20$a$ is, in other words, a curved surface formed by the bus being moved in the peripheral direction with an axial center of the backup ring 4 serving as the center.

According to the first embodiment, each outer side in the axial direction of two annular projections 19 positioned on both sides in the axial direction, and positioned on the upper side and the lower side in FIG. 1, is formed having a larger diameter than the inner diameter of the annular projection 19. Therefore, the virtual inner peripheral surface 20$a$ formed by the bus that linearly connects the peak sections 19$a$ of all annular projections 19 along the axial direction is formed into a simple curved surface (conical surface) similar to an outer peripheral surface of a frustroconical shape that is a cone from which the peak is removed.

An angle $\alpha$ of the taper or, in other words, an angle formed not only with the axial center of the backup ring 4, but also with the axial center of the reciprocating shaft 8, is optimally within a range of 1 to 15 degrees. When the angle $\alpha$ is less than the range, the annular projections 19 comes into strong contact with the reciprocating shaft 8 under high pressure. Alternatively, the annular projections 19 are crushed, and the inner surface of the backup ring 4 comes into contact with the reciprocating shaft 8 over its entire surface. Space required by an annular groove 21, described hereafter, to hold a lubricating material becomes difficult to secure. Frictional force and abrasion become more frequent. On the other hand, when the angle $\alpha$ is greater than the range, durability of the backup ring 4 decreases. The annular projections 19, particularly the annular projection 19 provided closest to the sealed side OS and positioned on the upper side in FIG. 1, come into strong contact with the reciprocating shaft 8 under high pressure. Abrasion tends to become more frequent in only the annular projection 19 provided closest to the sealed side OS. The taper angle $\alpha$ of the backup ring 4 according to the first embodiment is three degrees.

The annular projections 19 according to the first embodiment are formed such as to have a low height, a long base, and a roughly triangular, angled cross-sectional shape. A valley is formed between each annular projection 19 and an adjacent projection 19. The valley forms the annular groove 21 that can hold the lubricating material.

In other words, the three annular projections 19 and two annular grooves 21 are alternately formed on the inner peripheral surface 20 of the backup ring 4 according to the first embodiment. In other words, the inner surface of the backup ring 4 is formed having a projecting and recessing shape along the axial direction by the annular projections 19 and the annular grooves 21 being alternately connected in the axial direction.

Only two or more annular projections 19 are required, such that at least one annular groove 21 can be formed on the inner peripheral surface 20 of the backup ring 4.

The lubricating material can be selected as required, based on design concept and the like, from a sealing fluid such as lubricating oil, grease differing from the sealing fluid, a solid lubricating material, and the like.

A peak angle $\beta$ of the annular projections 19 is optimally within a range of 120 to 160 degrees. When the peak angle $\beta$ is less than the range, when the annular projections 19 and the reciprocating shaft 8 come into contact under high pressure, the projecting and recessing shape formed by the annular projections 19 and the annular grooves 21 cannot be maintained because the annular projections 19 are crushed. As a result, the lubricating material can no longer be held. On the other hand, when the peak angle $\beta$ is greater than the range, formation of the annular grooves 21 themselves, holding the lubricating material to maintain a lubricating film on the front surface of the reciprocating shaft 8, becomes difficult. The peak angle $\beta$ of the annular projections 19 of the backup ring 4 according to the first embodiment is 145 degrees.

A cross-sectional shape of the annular projection 19 is merely required by an overall angled shape. The cross-sectional shape can be selected as required, based on design concept and the like, from various shapes, such as a trapezoid, a circular arc, a semicircle, a semi-ellipse, and various quadratic-curved shapes such as radial lines and cycloid curves.

However, it is vital that the peak angle $\beta$ is within a range of 120 to 160 degrees in terms of ensuring the function provided by the annular grooves 21 for holding the lubricating material. Variation examples of the annular projection 19 are shown in FIG. 3A and FIG. 3B. FIG. 3A shows a diagram of an annular projection 19A having a trapezoidal cross-section. FIG. 3B shows a diagram of a circular-arc shaped annular projection 19$b$.

The inner diameter of the virtual inner peripheral surface 20$a$ of the backup ring 4 according to the first embodiment, specifically the inner diameter of the peak section 19$a$ of the annular projection 19 having the smallest diameter and positioned closest to the sealing side OS is formed about 0.1 millimeter larger than the outer diameter of the reciprocating shaft 8. The annular projection 19 is formed such that, in a usage state that is a steady state in which the pressure applied from the sealed side OS is not high, a non-contact state is maintained in which a gap of about 0.1 millimeters is formed between the annular projection 19 and the outer peripheral surface of the reciprocating shaft 8.

As shown in FIG. 1, an individually formed backup ring 4 according to the first embodiment is mounted between the atmosphere side AS of the seal lip 7 of the main seal 2 and the sealed side OS of the dust seal 3, when the dust reinforcing ring 13 is mounted on the main reinforcing ring 5.

Therefore, the oil seal 1 for reciprocation motion according to the first embodiment includes the main seal 2 that includes the seal main body 6 and is disposed on the sealed side OS, and the dust seal 3 that is disposed on the atmosphere side AS of the main seal 2. The oil seal 1 for reciprocation motion is configured such that the dust seal 3 also functions as a holding member 22 that holds the backup ring 4 the holding member 22 and the seal main body 6 in a sandwiched-state.

As the holding member 22, all that is required is that the holding member 22 hold the backup ring 4 between the holding member 22 and the seal main body in a sandwiched-state. Instead of the dust seal 3, for example, a configuration can be made in which a stopper ring is attached to the reciprocating shaft 8 or a housing (not shown), and the stopper ring functions as the holding member 22.

Other configurations are similar to a conventional oil seal for reciprocation motion. Detailed descriptions thereof are omitted.

Next, effects of the above-described configuration according to the first embodiment will be described.

In the oil seal 2 for reciprocation motion according to the first embodiment, the plurality of annular projections 19 are arrayed on the inner peripheral surface 20 of the backup ring 4, along the axial direction. The annular grooves 21 are formed by the valley between each annular projection 19 and its adjacent annular projection 19. The virtual inner peripheral surface 20a, formed by the bus that linearly connects the peak sections 19a of the annular projections 19 along the axial direction, forms a taper that increases in diameter from the sealed side OS towards the atmosphere side AS along the axial direction. Therefore, the tapered virtual inner peripheral surface 20a of the backup ring 4 can maintain a non-contact state with the reciprocating shaft 8 in at least an area of the inner peripheral surface 20 of the backup ring 4 on the atmosphere side AS, even when the oil seal 1 for reciprocation motion is used under a high pressure of, for example, 2 MPa to 9 MPa. Therefore, the annular grooves 21 can be prevented from being crushed by the pressure. As a result, high performance can be achieved by the inner peripheral surface 20 of the backup ring 4 being prevented from coming into contact with the reciprocating shaft 8 over its entire surface. In other words, even when the oil seal 1 for reciprocation motion is used under high pressure, the lubricating material can be held by the annular grooves 21 on the backup ring 4. The lubricating film between the backup ring 4 and the reciprocating shaft 8 can be maintained with certainty. Therefore, abrasion and deformation can be prevented from advancing.

Therefore, in the oil seal 1 for reciprocation motion according to the first embodiment, a stable sealed state can be maintained over a long period of time. An oil seal 1 for reciprocation motion having superior durability and a long life can be easily achieved.

This can also be confirmed through following test results. The oil seal 1 for reciprocation motion according to the first embodiment is a present invention. An oil seal for reciprocation motion including a conventional, common backup ring is a conventional product 1. The conventional product 1 does not include the annular projections 19 and the annular grooves 21 formed on the inner surface of the backup ring 4 of the present invention. The backup ring of the conventional product is not tapered, but is columnar. An oil seal for reciprocation motion including a backup ring provided with conventional annular grooves that hold a lubricating agent is a conventional product 2. In the conventional product 2, the taper angle α of the backup ring 4 of the present invention is zero degrees (although the annular projections 19 and the annular grooves 21 are provided, the taper angle α is zero degrees. The present invention, the conventional product 1, and the conventional product 2 were respectively assembled into shock absorbers. Evaluation tests for abrasion amount and durability were conducted at ±1 millimeter and 15 Hz. In the present invention, fatigue frequency was eight million times, and the abrasion amount was 0.01 square millimeter. In the conventional product 1, fatigue frequency was one million times, and the abrasion amount was 0.04 square millimeters.

In the conventional product 2, fatigue frequency was five million times, and the abrasion amount was 0.02 square millimeters.

In the oil seal 1 for reciprocation motion according to the first embodiment, because the taper angle α of the backup ring 4 is 1 to 15 degrees, even when the oil seal 1 for reciprocation motion is used under high pressure, an area of the inner peripheral surface 20 of the backup ring 4 on at least the atmosphere side AS can be held in a non-contact state with the reciprocating shaft 8, easily and with certainty.

In the oil seal 1 for reciprocation motion according to the first embodiment, the annular projections 19 of the backup ring 4 have an angled cross-section. The peak angles of the annular projections 19 are 120 to 160 degrees. Therefore, the annular grooves 21 that secure space required to hold the lubricating material can be formed in the valleys between each annular projection 19 and its adjacent annular projection 19, easily and with certainty.

The oil seal 1 for reciprocation motion according to the first embodiment includes the main seal 2 that includes the seal main body 6 and is disposed on the sealed side OS, and the dust seal 3 that is disposed on the atmosphere side AS of the main seal 2. The backup ring 4 is mounted between the atmosphere side AS of the seal lip 7 of the main seal 2 and the sealed side OS of the dust seal 3. Therefore, sealing fluid can be prevented from leaking from the sealed side OS towards the atmosphere side AS. Moreover, dust, such as dirt and debris, from the atmosphere side AS can be prevented from infiltrating the sealed side OS. As a result, a stable sealing performance can be maintained over a long period of time.

FIG. 4 is an enlarged cross-sectional view of main components of an oil seal for reciprocation motion according to a second embodiment of the present invention.

An oil seal 1A for reciprocation motion according to the second embodiment uses a backup ring 4A including a plurality of annular grooves 21A on the inner surface, instead of the above-described backup ring 4 of the oil seal 1 for reciprocation motion according to the first embodiment.

In other words, in the backup ring 4A of the oil seal 1A for reciprocation motion according to the second embodiment, an inner peripheral surface 20A, namely a surface opposing the outer peripheral surface of the reciprocating shaft 8, forms a taper that increases in diameter from the sealed side OS towards the atmosphere side AS along the axial direction. A taper angle αA of the inner peripheral surface 20A is the same as the taper angle α of the virtual inner peripheral surface 20a of the backup ring 4 of the oil seal 1 for reciprocation motion according to the first embodiment, described above.

The inner peripheral surface 20A of the backup ring 4A of the oil seal 1A for reciprocation motion according to the second embodiment has a plurality of annular grooves 21A arrayed along the axial direction, at a predetermined interval. According to the second embodiment, three annular grooves 21A having a roughly semi-circular cross-section are formed. The predetermined interval is, for example, about 0.5 to 1.5 millimeters.

The cross-sectional shape of the annular grooves 21A can be selected from various shapes, such as a triangle, a rectangle, a polygon, a trapezoid, a semi-circle, a semi-ellipse, and a circular-arc.

Other configurations are similar to the backup ring 4 of the oil seal 1 for reciprocation motion according to the first embodiment, described above. Therefore, configurations that are the same or equivalent to those of the above-described backup ring 4 are given the same reference numbers in the drawings. Explanations thereof are omitted.

In the oil seal 1A for reciprocation motion according to the second embodiment, configured as described above, similar effects as those achieved by the above-described oil seal 1 for reciprocation motion according to the first embodiment can be achieved.

In other words, in the oil seal 1A for reciprocation motion according to the second embodiment, the inner peripheral surface 20A of the backup ring 4A forms a taper that increases in diameter from the sealed section OS towards the atmosphere side AS in the axial direction. Therefore, like the above-described backup ring 4 of the oil seal 1 for reciprocation motion according to the first embodiment, the inner peripheral surface 20A of the backup ring 4A forming the taper can maintain a non-contact state with the reciprocating shaft 8 in at least an area on the inner peripheral surface 20A of the backup ring 4A on the atmosphere side AS, even when the oil seal 1A for reciprocation motion is used under a high pressure of, for example, 2 MPa to 9 MPa. Therefore, the annular grooves 21 can be prevented from becoming crushed by the pressure. As a result, high performance can be achieved by the inner peripheral surface 20A of the backup ring 4A being prevented from coming into contact with the reciprocating shaft 8 over its entire surface. In other words, even when the oil seal 1A for reciprocation motion is used under high pressure, the lubricating material can be held on the inner peripheral surface 4A of the backup ring 4A. Therefore, abrasion and deformation can be prevented from advancing.

Therefore, in the oil seal 1A for reciprocation motion according to the second embodiment, a stable sealed state can be maintained over a long period of time. An oil seal 1A for reciprocation motion having superior durability and a long life can be easily achieved.

Moreover, in the oil seal 1A for reciprocation motion according to the second embodiment, the taper angle $\alpha A$ of the backup ring 4A is 1 to 15 degrees. Therefore, like the above-described backup ring 4 of the oil seal 1 for reciprocation motion according to the first embodiment, even when the oil seal 1A for reciprocation motion is used under high pressure, an area of the inner peripheral surface 20A of the backup ring 4A on at least the atmosphere side AS can be held in a non-contact state with the reciprocating shaft 8, easily and with certainty.

The oil seal 1A for reciprocation motion according to the second embodiment includes the main seal 2 that includes the seal main body 6 and is disposed on the sealed side OS, and the dust seal 3 that is disposed on the atmosphere side AS of the main seal 2 (see FIG. 1). The backup ring 4A is mounted between the atmosphere side AS of the seal lip 7 of the main seal 2 and the sealed side OS of the dust seal 3. Therefore, sealing fluid can be prevented from leaking from the sealed side OS towards the atmosphere side AS. Moreover, dust, such as dirt and debris, from the atmosphere side AS can be prevented from infiltrating the sealed side OS. As a result, a stable sealing performance can be maintained over a long period of time.

The oil seal for reciprocation motion of the present invention can be used in various devices used to seal a reciprocating shaft in a shock absorber of a suspension device used in a vehicle, such as an automobile and a two-wheeled vehicle, and the like. The oil seal for reciprocation motion of the present invention can also be used as an oil seal for rotation used to seal a rotating shaft.

The present invention is not limited to each of the above-described embodiments. Various modifications can be made as required.

The invention claimed is:

1. An oil seal for reciprocation motion comprising:
   a seal main body including a seal lip configured for sliding contact with a reciprocating shaft;
   a backup ring made of resin which is disposed so as to support the seal lip from an atmosphere side to ensure durability of the seal lip and in which at least a single annular groove is formed in an inner peripheral surface configured to oppose the reciprocating shaft, the annular groove capable of holding a lubricating material;
   a holding member that holds the backup ring between the holding member and the seal main body in a sandwiched-state, wherein:
   a plurality of annular projections each having an angled-cross section are arrayed on the inner peripheral surface of the backup ring along an axial direction of the reciprocating shaft,
   the annular groove is formed by a valley between two adjacent annular projections of said plurality of annular projections each having the angled-cross section,
   a virtual inner peripheral surface formed by a bus linearly connecting peak sections of the plurality of annular projections, each having the angled-cross section, along the axial direction forms a tapered inner peripheral surface that increases in diameter from a sealed side towards the atmosphere side in the axial direction, an angle of the taper inner peripheral surface is 1 to 15 degrees, peak angles of the annular projections are 120 to 160 degrees,
   a smallest diameter portion of the inner peripheral surface is a smallest diameter portion of the virtual inner peripheral surface and a size of an inner diameter of the smallest diameter portion of the virtual inner peripheral surface is larger than an outer diameter of the reciprocating shaft, and
   the oil seal for reciprocation motion is configured such that when the oil seal is used under a steady state in which a pressure from the sealed side is less than 2 MPa, there is a gap between the smallest diameter portion of the virtual inner peripheral surface and an outer surface of the reciprocating shaft, and
   when the oil seal is used under high pressure in which the pressure from the sealed side is 2 MPa to 9 MPa, at least an area of the virtual inner peripheral surface on the atmosphere side is maintained in a non-contact state with respect to the reciprocating shaft.

2. The oil seal for reciprocation motion according to claim 1, further comprising:
   a main seal including the seal main body and disposed on the sealed side, and a dust seal disposed on the atmosphere side of the main seal, wherein:
   the dust seal configures the holding member.

* * * * *